United States Patent [19]
Franklin, III et al.

[11] Patent Number: 5,350,611
[45] Date of Patent: Sep. 27, 1994

[54] INTEGRAL END ATTACHMENT FITTING

[75] Inventors: Walter M. Franklin, III, Canyon Country; Matthew G. Swain, LaCrescenta; Bryan W. Kreimendahl, Van Nuys, all of Calif.

[73] Assignee: Lockheed Corporation, Calabasas, Calif.

[21] Appl. No.: 19,250

[22] Filed: Feb. 18, 1993

Related U.S. Application Data

[62] Division of Ser. No. 803,805, Dec. 9, 1991, Pat. No. 5,217,555.

[51] Int. Cl.$^5$ ............................................. B29D 22/00
[52] U.S. Cl. ................................... 428/36.91; 428/36.9
[58] Field of Search .............................. 428/36.9, 36.91

[56] References Cited

U.S. PATENT DOCUMENTS

| | | | |
|---|---|---|---|
| 2,715,087 | 8/1955 | Barrados | 156/198 |
| 2,997,411 | 8/1961 | Woolley | 156/294 |
| 3,962,006 | 6/1976 | Saito et al. | 156/309.6 |
| 4,292,368 | 9/1981 | Mialon | 156/198 |
| 4,483,731 | 11/1984 | Dohle et al. | 156/156 |

FOREIGN PATENT DOCUMENTS 44170  4/1976  Japan ................................ 156/156
2129365  5/1984  United Kingdom ................ 264/263

Primary Examiner—George F. Lesmes
Assistant Examiner—Christopher W. Raimund
Attorney, Agent, or Firm—Louis L. Dachs

[57] ABSTRACT

The invention is a hollow tubular member with an integral attachment end fitting. In detail, the product is made by a process comprising the steps of: providing a first hollow tubular member made of a composite material; providing a support member adapted to fit within the first tubular member; installing the support member within the first tubular member and joining thereto; providing a second hollow tubular member made of composite material; installing the second tubular member within the end of the first tubular member such that it abuts the support member; providing an inflatable bladder having an inflation tube attached thereto; installing the inflatable bladder within the first tubular member such that it abuts the support member and the inflation tube extends out the end; pressurizing the bladder causing it to expand and apply pressure to the first and second tubular members; heating a portion of both the first and second tubular members to forming temperatures; and forming a portion of first and second tubular members into a solid flat rectangular cross-sectional shaped attachment end fitting.

11 Claims, 3 Drawing Sheets

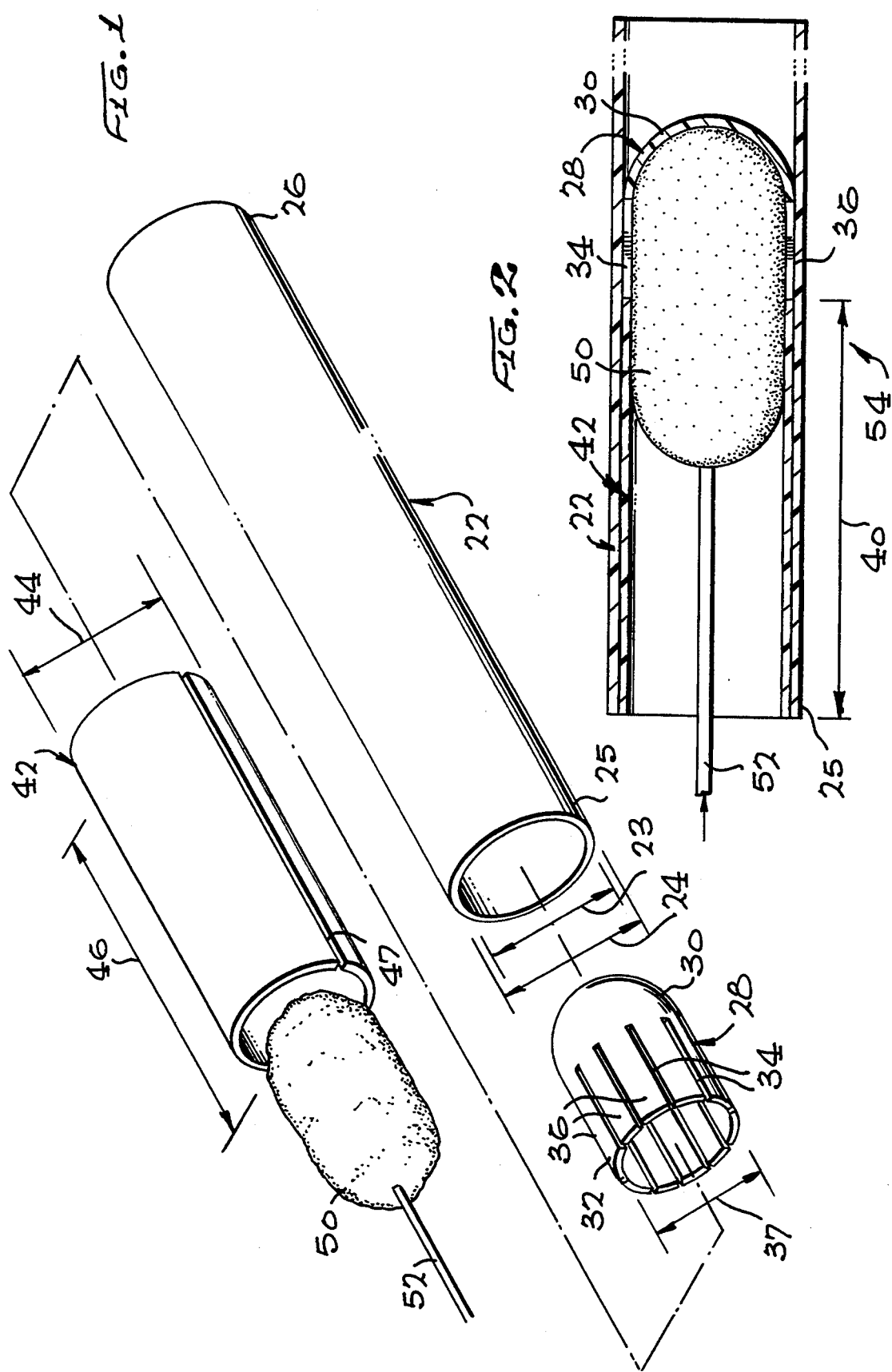

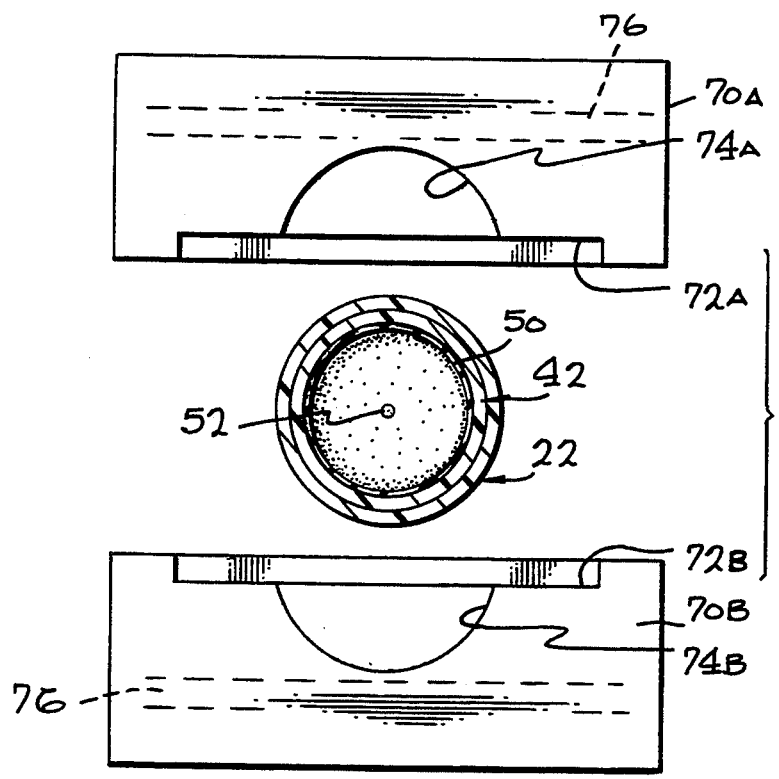
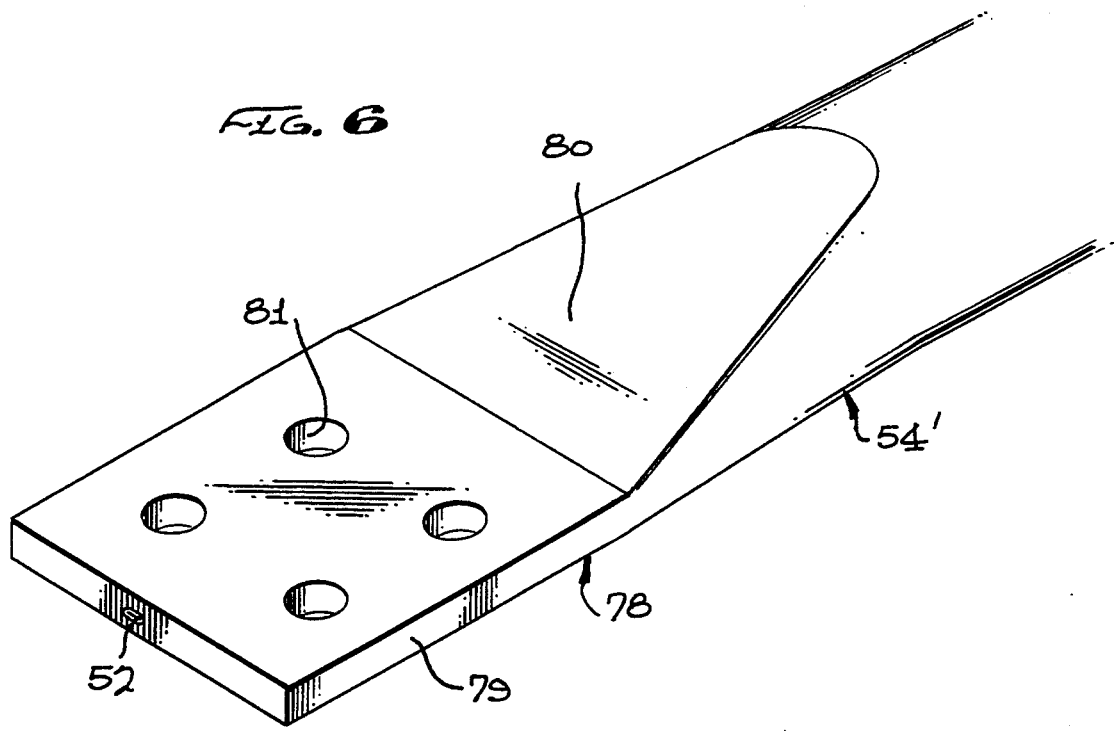

INTEGRAL END ATTACHMENT FITTING

This is a divisional of copending application Ser. No. 07/803,805 filed on Dec. 9, 1991, now U.S. Pat. No. 5,217,555.

BACKGROUND OF THE INVENTION

1. Field of the Invention

The invention relates to the field of the manufacture of composite structural members and, in particular, to a process for making hollow tubular structural members and the like having integral attachment end fittings.

2. Description of Related Art

With the advent of light-weight, high-strength composite materials having organic matrix materials, there has been a trend to replace many metal structural members on aircraft with such materials. However, the typical methods of joining metals, such as welding, riveting and bolting are not necessarily efficient methods for composite materials. In fact, simply replacing the metal components of a complex structure with components made of composite materials may not produce a weight or cost savings. Such reductions will only occur when due recognition is given to the fact that composite materials depend primarily on the filamentary reinforcements in the resin matrix for their high strength and modulus to weight ratios.

For example, in hollow tubular members such as struts, control rods, or support beams made from metal most often the end fitting is joined to the end of the hollow member by bolts or rivets. In many control rods the end of the tube is swagged over an attachment end fitting. In the former method the composite material may not have the bearing strength to absorb the highly localized stress loads. In the latter, swagging will severely damage the filamentary material. Additionally, the resin matrix material will not take the highly localized deformation without cracking. Of course, if the resin matrix material is a thermoplastic material that only melts when heated to forming temperatures, the end of the fitting could be heated to a point wherein the resin is soft and malleable. However, as previously stated, the filamentary material may not withstand the swagging. If the matrix material were a thermoset resin, one that cures (under goes a chemical change) when heated to forming temperatures no subsequent forming can be accomplished thereafter.

With hollow tubular members using thermoplastic resin matrix materials, attempts have been made to form an integral attachment fitting during or after the forming of the hollow tubular member. However, the flattening of the end of the tube into a rectangular plate has, generally resulted in a non-uniform transition portion between it and the circular portion of the tube. In addition, without both internal and external pressure, the transition portion will not be properly consolidated. Furthermore, the thin tube wall, even when flattened, often will not provide the necessary bearing strength to absorb the localized loads induced by fasteners. Thus, what is required is a process for forming an integral attachment end fitting that provides the necessary fastener hole bearing strength and, additionally, a smooth and consolidated transition between the flattened plate portion and the circular tube.

Thus it is a primary object of the subject invention to provide a process of making hollow tubular structural members and the like having integral end attachment fittings.

It is another primary object of the subject invention to provide a process of making hollow tubular structural members and the like having integral end attachment fittings from composite structural materials.

It is a further object of the subject invention to provide a process of making hollow tubular structural members and the like having integral end attachment fittings from composite structural materials that incorporate thermoplastic resin matrix materials.

SUMMARY OF THE INVENTION

The invention is a process for forming a hollow tubular member with an integral attachment end fitting. The method includes the step of providing a first hollow tubular member, which serves as the main body thereof. The first hollow tubular member is made of a composite material having filamentary reinforcing material in a thermoplastic resin matrix; the filamentary material is, preferably, woven. Additionally, it is preferable that the first tubular member have a circular cross-sectional shape; however, other cross-sectional shapes such as ellipses and like, are easily accommodated by the process.

A cup shaped member is provided that is adapted to fit within the first tubular member. It is installed within the first tubular member at a specific distance from one end thereof with the open end facing the one end and joined thereto, preferably by bonding. The side wall of cup shaped comprises a plurality of finger like members. This allows the cup shaped member to more easily accommodate any irregularities in the inner surface of the first tubular member upon installation. While the cup shaped member can be made of a wide variety of materials, the preferred material is a composite having a resin matrix material with processing or forming temperature above that of the resin matrix material of the first tubular member. It should also be noted that, while the cup shaped tubular member is preferred, it has also been found that a simple solid disk can be used; however, it can not conform to irregularities in the internal surface of the first tubular member.

The next step is to provide a second hollow tubular member that is adapted to fit within the first tubular member. It is also made of composite material having filamentary reinforcing material in a thermoplastic resin matrix; preferably the filamentary material is also woven. It is important that the resin matrix material therein be identical to or compatible with the resin matrix material of the first tubular member. The second tubular member has a second specific length at least as long as the first specific length of the first tubular member and is, preferably, equal thereto. In order to accommodate any irregularities in the inner surface of the first tubular member, it is desirable to use a second tubular member that has a diameter equal to or slightly larger in diameter than the first tubular member, which is split along its entire length such that it can be collapsed sufficiently to fit within the first tubular member. The next step includes the installation of the second tubular member within the first tubular member such that it abuts the cup shaped tubular member.

The next step is to provide a flexible walled inflatable bladder, having an inflation tube attached thereto, that is also adapted to fit within the first hollow tubular member. This bladder is installed within the first and second tubular members such that it abuts the end wall of the previously installed cup shaped member. It is necessary that the inflation tube have a length sufficient so as to extend out the end of the first tubular member when the bladder is installed and must have sufficient strength to withstand forming pressures to be subsequently applied. As will be subsequently discussed in detail, the attachment end fitting to be formed the includes a flat rectangular portion and a transition portion extending from the cross-sectional shape of the first tubular member thereto. Because the bladder is only used to aid in the formation of the transition portion, its length need be or should be on longer than the this transition portion.

Thereafter, both the specific length of the first tubular member and the second tubular member are heated to forming temperatures and the bladder is pressurized. After or as forming temperatures are reached, a portion of both the specific length of the first tubular member and the second tubular member are formed into a solid flat rectangular cross-sectional shaped attachment end fitting wherein the resin matrix materials of these formed portions are homogeneous. This forming is accomplished such that the remaining portions of both the specific length of the first tubular member and second tubular member are formed into the above mentioned smooth transition portion from their preformed cross-sectional shape to the solid flat rectangular cross-sectional shape. Due to the action of the now pressurized bladder, these remaining portions are joined such that they are a single "piece" with a homogeneous resin matrix. After forming, the pressure within the bladder is reduced to ambient and tube is cut off at the end of the now formed flat rectangular attachment end fitting and sealed.

A preferred apparatus for the heating and forming steps comprise a heated die for simultaneously forming the flat rectangular attachment end fitting and the transition portion and chill blocks that are placed about the first tubular member beginning at a point over the lip end of the cup shaped member to reduce the heat transfer thereto. By eliminating sharp transitions from the tubular shape of the first tubular member to the flat rectangular attachment fitting thus formed, stress concentrations are eliminated and uniform parts can be produced.

It can now be seen that the cup shaped member not only supports the first tubular member during the forming of the flat rectangular attachment end fitting preventing unwanted distortions in the wall thereof during forming but also properly positions the bladder. Additionally, the cup shaped member, if made of a composite material, should have a resin matrix material with a higher processing temperature than the resin matrix in the first and second tubular members. Otherwise, it might be ineffective at forming temperatures. However, if sufficient thermal protection is provided, then it could be made from the same thermoplastic resin. The cup shaped member can be made of other materials such as metals. While the bladder remains within the now formed structure, little weight is added thereto.

It is believed that the above described process produces a unique structure, for all practical purposes, which can only be made by the above process. Such a tubular truss member made in this fashion can produce a 30 to 40 percent weight savings over a conventional "T" cross-section truss designed to carry the same loads. Because the forming process is independent of the truss member length, it has the additional advantage in that prefabricated tubular stock can be stored and cut to length when needed for the tooling is independent of truss member length.

The novel features which are believed to be characteristic of the invention, both as to its organization and process of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 1 is an exploded perspective view of the components necessary to manufacture the hollow tubular member with integral attachment end fitting by the subject process in order of assembly.

FIG. 2 is a cross-sectional view of the assembled components illustrated in FIG. 1 prior to forming.

FIG. 4 is a cross-sectional view of the forming apparatus shown in FIG. 4 taken along the line 4—4 illustrating the interior of a portion of the forming apparatus.

FIG. 6 is a completed tubular member with integral attachment end fitting made by the subject process.

DESCRIPTION OF THE PREFERRED EMBODIMENT

Figure 3:
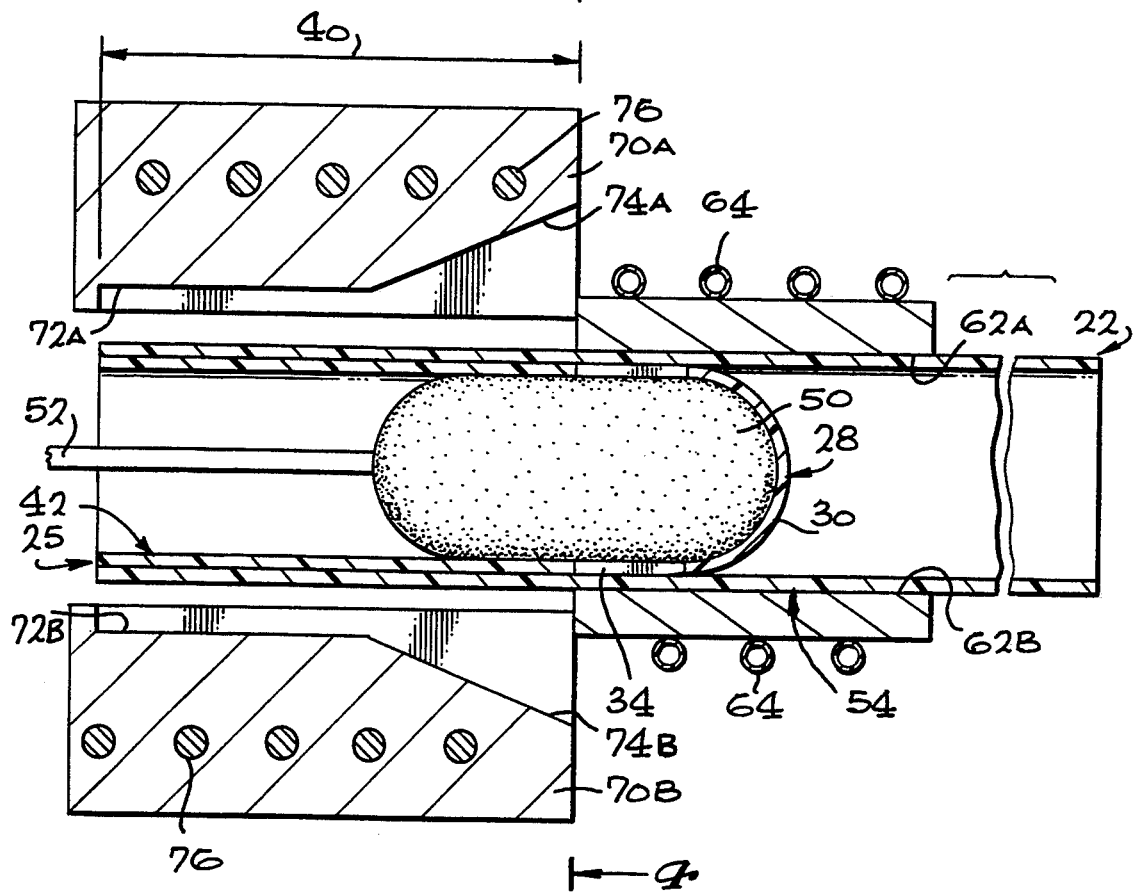
FIG. 3 is a side elevation view of the assembled components shown in FIG. 2 installed in a forming apparatus also illustrating one of the steps in the subject process.

Referring to FIGS. 1 and 2 it can be seen that process first involves the assembly of the components of the tubular member with an integral end fitting. In detail the components include a hollow tubular member 22 and as shown for purposes of illustration, it has a circular cross-section having inner and outer diameters, indicated by numeral 23 and 24, respectively. However, other cross-sectional shapes are possible, for example, elliptical cross-sectional shapes. The tubular member 22 is made of a composite material having filamentary material in a thermoplastic matrix material; preferably the filamentary material is woven. An example of a suitable composite material is a five-harness, satin weave fabric with a 6 to 1 ratio of axial to transverse graphite filamentary material in a polyethersulfone thermoplastic resin matrix. Such a composite material can be obtained from the ICI Fiberite Corporation, Tempe, Ariz. Normally, identical attachment end assemblies would be formed on each end 25 and 26 of the tubular member 22 and, thus, only the forming of one attachment end fitting on end 25 will be hereafter discussed. The first step is to provide such this tubular member 22.

The second step is to provide a cup shaped support member 28. The cup shaped member 28 includes a closed end 30 and a side wall 32 having a multinumber of slits 34 therein forming a plurality of fingers 36. The outer diameter, indicated by numeral 37, is slightly smaller than the inner diameter 23 of the tubular member 22. This configuration is preferred because upon installation into the tubular member 22, the fingers 36 can conform to any irregularities on the interior surface of the tubular member. If the interior surface of the tubular member 22 is smooth, a solid side wall 32 can be used. Preferably, the tubular member 28 is made from a composite material; however, as will be subsequently discussed, the resin matrix should have a forming temperature above the resin matrix material in the first tubular member 22. The tubular member 28 can also be made form other materials, such as a metal. The third step is to install the hollow tubular member 28 into the tubular member 22 and join it thereto, preferably by bonding. The tubular member 28 is installed and bonded into place at a distance, indicated by numeral 40, from the end 25 of the tubular member 22. While a cup shaped support member is preferred, a support member in the form of a simple tube or the like can be used.

A second tubular member 42 is provided having an outer diameter 44 that is equal to or slightly larger than the outer diameter 24 of the first tubular member 22. Its length 46 should be at least as long as the distance 40 of the tubular member 22 and preferably is equal thereto. The tubular member 42 is, preferably, slit along its entire length 46 to form a gap 47 such that it can be collapsed sufficiently to fit within the interior of the tubular member 22. This will allow the second tubular member 42 to accommodate any irregularities in the in surface thereof. However, again, if the interior surface is smooth and uniform, the second tubular member 22 may have an outer diameter 44 that is only slightly smaller than the inner diameter 23 thereof and need not be split. The next step is to install the second tubular member 42 into the second tubular member 22. This is accomplished by simply collapsing it and sliding it into the second tubular member 22 until it "bottoms" against the cup shaped member 28.

An inflatable flexible walled bladder 50 is provided having an inflation tube 52. It is important that the bladder material be capable of operating at the resin forming temperatures and be able to withstand 100 pounds per square inch internal pressure normally required in the forming process. Bladders made of Kapton material have proven usable. The tube 52 should have as small a diameter as possible and must have sufficient strength to also withstand the internal inflation pressure as well as the pressures induced during forming. This bladder 50 is installed with the first and second tubular members 22 and 42, respectively, such that it abuts the closed end 30. As will be subsequently discussed in detail, the attachment end fitting to be formed the includes a flat rectangular portion and a transition portion from the cross-sectional shape of the first tubular member thereto. Because the bladder is only used to aid in the formation of the transition portion, its length need be or should be on longer than the this transition portion; however, the tube 52 also must have sufficient length so that it extends out of the end 25. This completes the assembly and for purposes of discussion is hereinafter designated by numeral 54.

Figure 5:
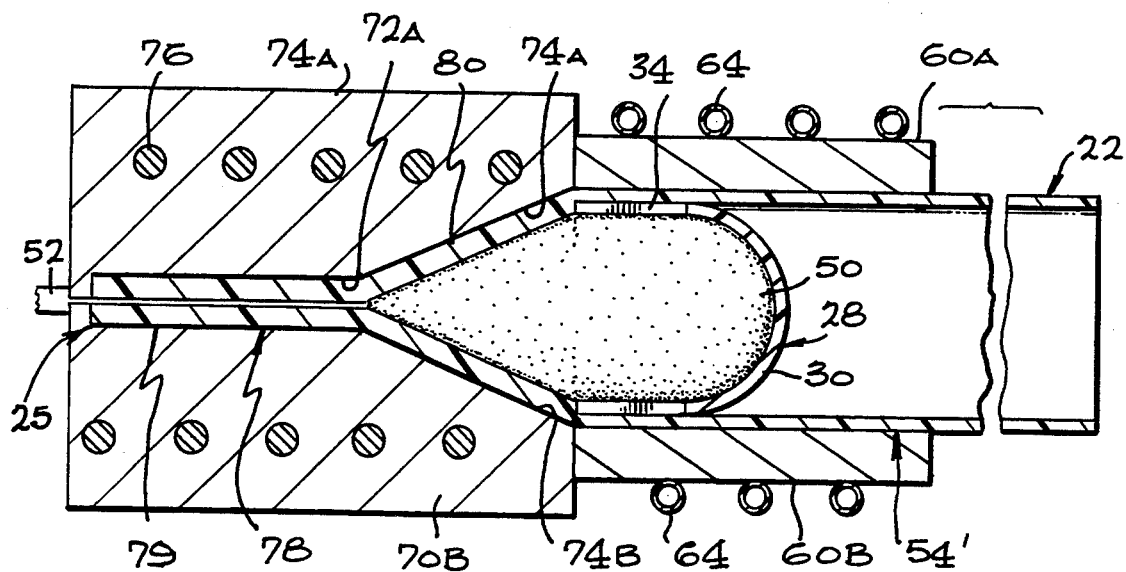
FIG. 5 is a view similar to FIG. 4 wherein the assembled components have been molded into a tubular member with integral attachment end fitting.

Referring to FIGS. 3, 4 and 5, the next step is to install chill blocks 60A and 60B about assembly 54 beginning at the distance 40 from the end 25. The blocks 60A and 60B, have grooves 62A and 62B, respectively, such that when joined, form a passage way having a cross-section conforming to the tubular member 22. Preferably, the chill blocks are made of metal having good heat transfer characteristics and incorporate cooling tubes 64 for circulating cooling fluid (not shown). Die halves 70A and 70B are provided that incorporate rectangular grooves 72A and 72B and tapered grooves 74A and 74B, respectively that, when combined, form die cavities for forming the rectangular attachment end fitting. The die halves 70A and 70B are preferably first heated to the forming temperature of the resin matrix material in the tubular portions 22 and 42 and then are placed about the tubular member 22 such that they extend over the first specific distance 40 thereof. This can be accomplished by heating elements 76 installed in the die halves. To simplify the tooling and reduce the number of parts, the chill blocks 60A and 60B, and die halves 70A and 70B can be combined into a single assembly.

As particularly shown in FIG. 5, the die halves 70A and 70B are thereafter brought together to form an attachment end fitting, designated by numeral 78, that comprises a flat rectangular portion 79 and a transition portion 80. The die halves 70A and 70B and chill blocks 60A and 60B are then removed. All that need now be accomplished is to cutoff and seal the tube 52 and drill the fastener holes 81. The fully completed hollow tubular member having an integral attachment end fitting is illustrated in FIG. 6 and is designated by numeral 54'.

It can be seen that the chill blocks reduce the heat transfer into the portion 64 and the main portion of the tubular member 22 so that it is unaffected by the heat. Of more importance, the tubular member 28 provides localized support insuring that the main portion of the tubular member 22 remains intact and forming only takes place in the transition portion and there beyond. Furthermore, the transition portion 80 remains constant from part to part. The second tubular member 42 acts as a "doubler" providing additional thickness to flat rectangular portion 78 increasing the bearing strength of the fastener holes 81. It should also be readily apparent that the tubular member 22 can have other cross-sectional shapes such as an ellipse. This will, of course, require different designs for the first tubular member 22, cup shaped member 28, second tubular member 42, chill blocks 60A and 60B, and dies 70A and 70B, and possibly bladder 50.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to any industry manufacturing composite structures, but particularly to the aircraft industry.

We claim:

1. A hollow tubular member having an integral attachment end fitting manufactured by the method comprising the steps of:
    providing a first hollow tubular member made of a composite material having filamentary reinforcing material in a thermoplastic resin matrix;
    providing a support member adapted to fit within said first tubular member;
    installing said support member within said first tubular member a first specific distance from one end thereof and joining thereto;
    providing a second hollow tubular member made of composite material having filamentary reinforcing material in a thermoplastic resin matrix, said second tubular member having a second specific length at least as long as said first specific length of said first tubular member and adapted to fit therein;

installing said second tubular member within said one end of said first tubular member such that it abuts said support member;

providing an inflatable bladder having an inflation tube attached thereto;

installing said inflatable bladder within said first and second tubular members such that it abuts said support member and said inflation tube extends out said one end;

pressurizing said bladder causing it to expand and apply pressure to said first and second tubular members;

heating said second tubular member and said specific length of said first tubular member to forming temperatures; and forming at least a portion of both said second tubular member and said specific length of said first tubular member into a compacted solid flat rectangular cross-sectional shaped attachment end fitting.

2. The fitting as set forth in claim 1 wherein during the step of forming said remaining portion of both said second tubular member and said specific length of said first tubular member are formed into a smooth compacted transition portion extending from their preformed cross-sectional shape to said solid flat rectangular cross-sectional shape.

3. The fitting as set forth in claim 2 wherein said filamentary material of said first and second tubular members is woven.

4. The fitting as set forth in claim 3 wherein said first tubular member has a circular cross-sectional shape.

5. The fitting as set forth in claim 4 wherein said second tubular member is equal to or slightly larger in diameter than said first tubular member and is split along its entire length such that it can be collapsed sufficiently so as to fit within said first tubular member.

6. The fitting as set forth in claim 5 wherein: said support member is a cup shaped member:

during the step of installing said support member, said cup shaped member is installed in said first tubular member with its open end facing said end thereof; and during the step of installing said bladder, said bladder is installed so as to abut the closed end of said cup shaped member.

7. The fitting as set forth in claim 6 wherein said bladder is of a size sufficient when installed so as to extend within said first and second tubular members.

8. The fitting as set forth in claim 7 wherein:

the said wall of said cup shaped tubular member comprises a plurality of flat finger like members.

9. The fitting as set forth in claim 8 wherein said step of joining said cup shaped member to said first tubular member is accomplished by bonding.

10. The fitting as set forth in claim 9 wherein said second specific length of said second tubular member is equal to said first specific length.

11. The fitting as set forth in claim 10 wherein said cup shaped member is made of composite material having a resin matrix material with a higher forming temperature than said resin matrix material of said first and second tubular members.

* * * * *